(12) United States Patent
Yamaguchi et al.

(10) Patent No.: US 7,231,901 B2
(45) Date of Patent: Jun. 19, 2007

(54) DIRECT-INJECTION ENGINE, METHOD OF CONTROLLING THE SAME, PISTON USED IN THE SAME AND FUEL INJECTION VALVE USED IN THE SAME

(75) Inventors: Jun'ichi Yamaguchi, Chiyoda-ku (JP); Hiroshi Fujii, Chiyoda-ku (JP); Ryoichi Komuro, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/400,282

(22) Filed: Apr. 10, 2006

(65) Prior Publication Data

US 2006/0254559 A1    Nov. 16, 2006

(30) Foreign Application Priority Data

Apr. 11, 2005  (JP)  ............... 2005-112964

(51) Int. Cl.
*F02B 23/10* (2006.01)
(52) U.S. Cl. .................. 123/298; 123/261; 123/305
(58) Field of Classification Search ................ 123/298, 123/261, 276, 301, 302, 305
See application file for complete search history.

(56) References Cited

U.S. PATENT DOCUMENTS 4,401,071 A * 8/1983 Zurner et al. ............... 123/276
5,720,253 A * 2/1998 Matoba et al. .............. 123/298
6,378,486 B1   4/2002 Spiegel et al.
6,705,275 B2 * 3/2004 Fukuzumi .................. 123/295

FOREIGN PATENT DOCUMENTS

| EP | 1 081 350 A2 | 3/2001 |
| JP | 2000-087750 A | 3/2000 |
| JP | 2000-130171 A | 5/2000 |
| JP | 2002-115549 A * | 4/2002 |

OTHER PUBLICATIONS

European Search Report dated Aug. 22, 2006 (Seven (7) pages).

* cited by examiner

*Primary Examiner*—Hieu T. Vo
(74) *Attorney, Agent, or Firm*—Crowell & Moring LLP (57) ABSTRACT

An injector having three concentrated fuel spray bands is used, one of the fuel spray bands is directed to a spark plug, and the others are directed to curved grooves on a piston. The sprays that enter each groove advance along each groove, mutually collide substantially under the spark plug, and are ascended. Further, these spray bands are carried to the vicinity of the spark plug by a tumble flow and stable stratified air-fuel mixture is formed. As described above, stable and satisfactory stratified combustion can be made.

18 Claims, 9 Drawing Sheets

DIRECT-INJECTION ENGINE, METHOD OF CONTROLLING THE SAME, PISTON USED IN THE SAME AND FUEL INJECTION VALVE USED IN THE SAME

CLAIM OF PRIORITY

The present application claims priority from Japanese application serial no. 2005-112964, filed on Apr. 11, 2005, the content of which is hereby incorporated by reference into this application.

BACKGROUND OF THE INVENTION

The present invention relates to a so-called direct-injection engine (it's also called as "in-cylinder direct injection type internal combustion engine") in which a fuel (for example, gasoline) is directly injected into a cylinder and also relates to a method of controlling the engine, a piston used in the engine, and a fuel injection valve used in the engine.

A direct-injection engine, disclosed in Japanese Unexamined Patent Publication No. 2000-130171, is based upon a direct injection/spark ignition type internal combustion engine, and which is provided with two intake valves and two exhaust valves at a cylinder head forming a pent roof type combustion chamber. Furthermore, the engine is provided with a spark plug at a substantial center of the cylinder head and a fuel injection valve for directly injecting a fuel into the cylinder. The fuel injection valve is arranged on the side of the intake valves in a state of being directed toward the center of the cylinder. In this arrangement, stratified combustion is realized by injecting the fuel at a compression stroke in a state where a tumble flow component of intake air is formed in the cylinder. In this prior art, a bowl, which has a cylindrical surface or spherical surface extending along a piston diameter line nearly orthogonally crossing with a fuel spray axis, is recessed on the center of a piston crown surface. Furthermore, a recessed portion recessed more deeply than the bowl is formed in a range from the intake valve side of the piston crown surface to the nearly center of the piston so that a fuel spray injected in the vicinity of a top dead center at a compression stroke is guided to the side of the spark plug.

However, as a normal conical spray with nearly uniform distribution in a circumferential direction is used in the above-mentioned configuration, a penetration of the spray is relatively small. Therefore, at the vicinity of the top dead center in the compression stroke such as approximately at 30 degrees before the top dead center, a spray angle is narrowed, and the whole quantity of the spray is injected toward the piston. Therefore, the recessed portion on the piston crown is required to be made deep so that the depth is equivalent to approximately a quarter of the height of the cylinder between 30 degrees and 10 degrees before the top dead center in a crank angle.

According to the above configuration, as the bowl is relatively deep, and the additional recessed portion deeper than the bowl is provided, the surface area of the piston increases. As a result, particularly in a high-load condition of the engine, output and fuel economy of the engine are deteriorated due to the increase of cooling loss is caused.

SUMMARY OF THE INVENTION

The invention is to realize a combustion system capable of making the cooling loss smaller and of improving engine output and combustion efficiency.

The direct-injection engine of the present invention basically comprises a fuel injection valve for directly injecting a fuel into a cylinder and a piston crown with a curved wall guide for guiding a fuel spray injected from the fuel injection valve. Furthermore, the fuel injection valve is configured to inject the fuel spray distributed in a direction of a spark plug provided on a cylinder head and in a direction of the curved wall guide on the piston crown. The curved wall guide is provided with an arc-shaped curved wall surface being extended in a direction from the circumference side of the piston to the center thereof.

DESCRIPTION OF THE PREFERRED EMBODIMENTS

Figure 1:
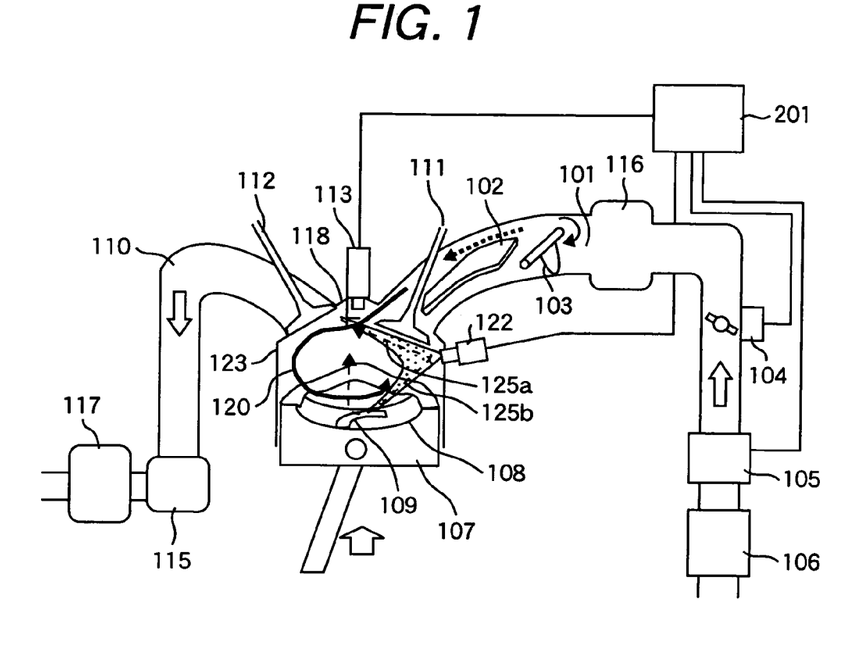
FIG. 1 is a block diagram showing a first embodiment of the invention viewed from the substantial side of a cylinder.
Figure 2:
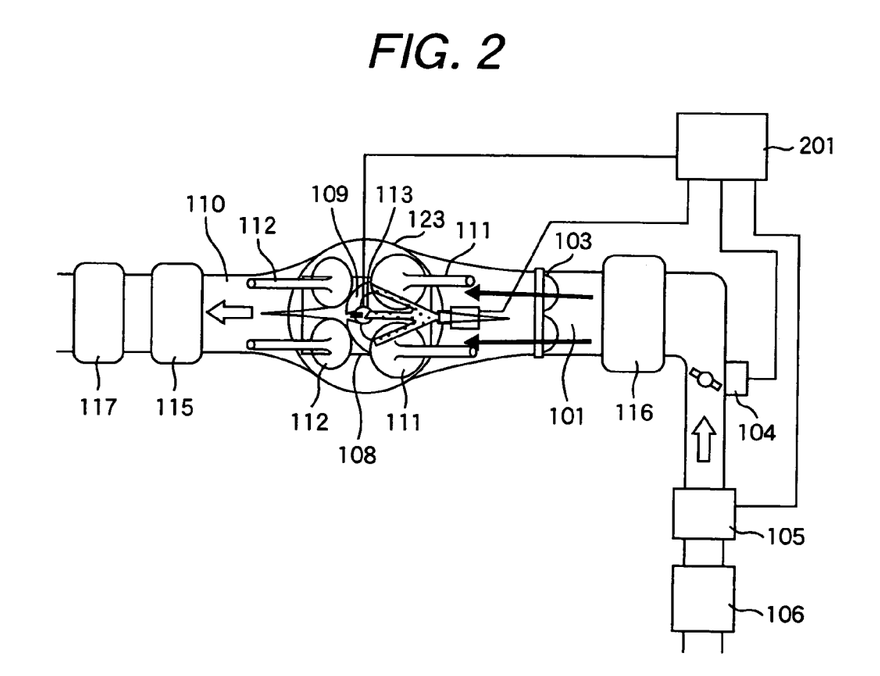
FIG. 2 shows the configuration of the first embodiment of the invention viewed from the upside of an engine.
Figure 3:
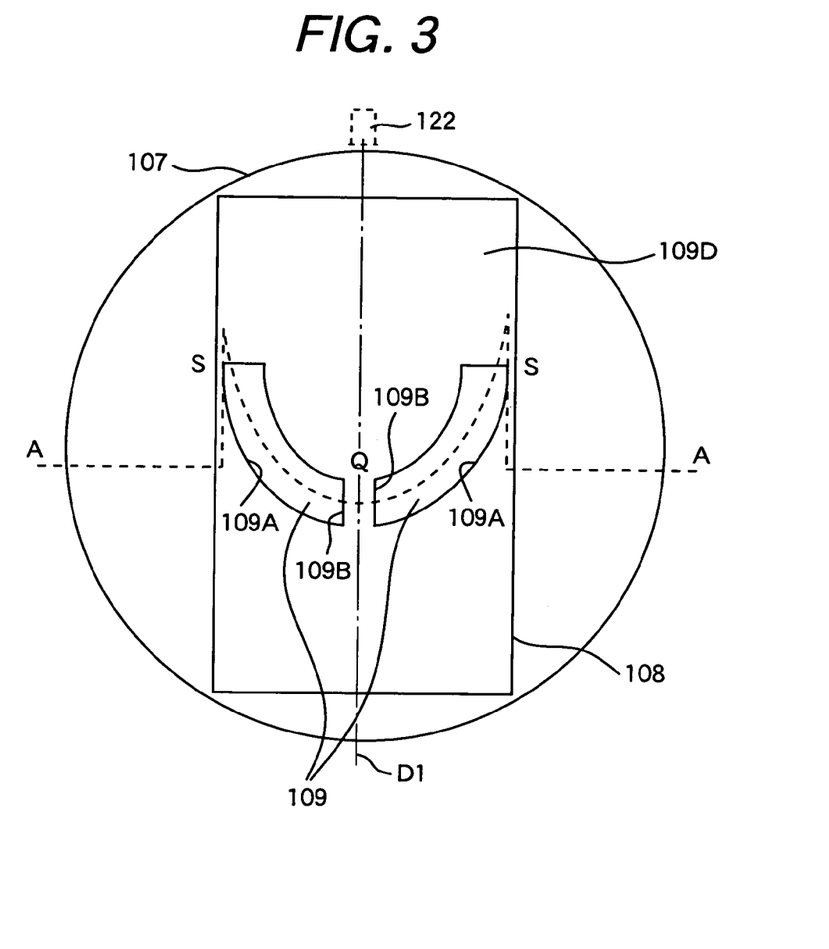
FIG. 3 is a top view showing a piston in the first embodiment.
Figure 4:
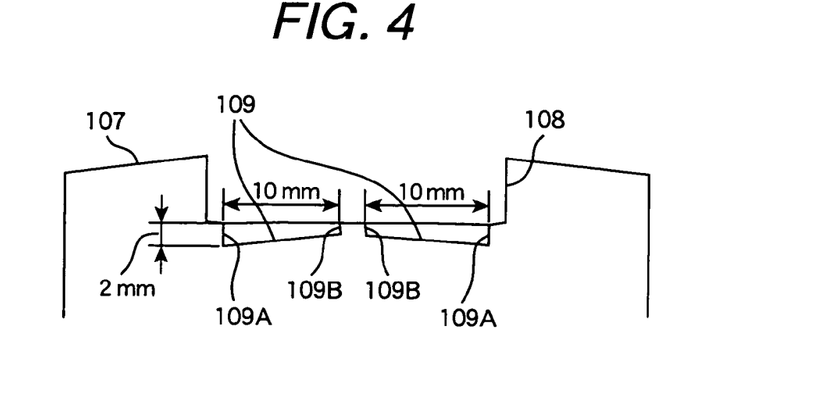
FIG. 4 shows the piston in the first embodiment developed along curved grooves.

FIGS. 1 to 4 are block diagrams showing a direct-injection engine system according to a first embodiment of the invention. FIG. 1 shows the system viewed substantially from the side, FIG. 2 shows the system viewed from the upside of an engine, FIG. 3 shows only a piston viewed from the top, and FIG. 4 shows a curved groove on the piston shown in FIG. 3 on a virtual cross section viewed along a line A—A shown in FIG. 3. Although this embodiment mainly is premised on a multi-cylinder engine, one cylinder will be described to simplify the description.

As shown in FIGS. 1 and 2, a cylinder head is provided with two intake valves 111 and two exhaust valves 112. A spark plug 113 is installed at the center of the cylinder head. An injection valve (hereinafter called "injector") 122 is installed in the vicinity of the intake valves 111 and nearly on the circumference of the cylinder head. A curved surface portion 108 as the bottom of a cavity is formed on a top surface (namely a piston crown surface) of a piston 107 along a direction from the side of the intake valve 111 to the side of the exhaust valve 112. The curved surface portion (cavity) 108 has a rectangle area. Furthermore, two curved grooves 109, being respectively shaped approximately like quarter-circumference arcs e.g., are provided on the curved surface portion 108 of the cavity with in the rectangle area. Two curved grooves 109 are disposed on the curved surface portion 108 so as to be symmetric with respect to a piston diameter line (D1) linking between a point (on the piston circumference) directly below the fuel injection valve 122 and the center (Q) of the piston crown. A starting point (S) of each curved groove 109 is located in the vicinity of the longitudinal edge of the piston curved surface portion 108 and nearer to the injector 122 than an endpoint (E) of the curved groove 109. The endpoint (E) of curved groove 109 is located near the center (Q) of the piston crown. Namely, a pair of curved grooves 109 are extended from the respective starting points (S) to the position nearly below a spark plug 113 on the piston 107 so that both distances of the curved grooves 109 are substantially equal to each other. As shown in FIG. 4, for example, each groove 109 is approximately 2 mm in depth at the starting point (S), the width between the starting point (S) and the endpoint (E) is approximately 10 mm, and the depth is made shallower gradually toward the center of the piston 107 (namely toward the endpoint (E) of the curved groove 109).

An intake pipe 101 is vertically divided into two intake passages, which are an upper passage and a lower passage, with a partition plate 102 in the vicinity of a cylinder 118. An intake control valve 103 is installed immediate upstream the partition plate 102 so that the intake control valve is capable of closing the lower passage of the intake pipe 101.

The injector 122 is installed at the cylinder block or the cylinder head to directly inject a fuel into the cylinder 118. The injector 122 is configured to inject the fuel spray distributed in a direction of the spark plug 113 and in a direction of the curved wall guide (which comprises curved the surface portion 108 and the curved grooves 109) on the piston crown. That is, the fuel spray from the injector 122 has a plurality of concentrated fuel spray band portions, for example three concentrated fuel spray band portions in this embodiment, and one thereof is directly directed to the spark plug 113, and the other two are directly directed to two curved grooves 109 of the piston 107.

Air is taken in from the right lower side in FIGS. 1 and 2, passes an air cleaner 106, its flow rate is measured by an air flow meter 105, and after the flow rate is controlled by an electronic controlled throttle valve 104, the air is distributed to each cylinder at a collector 116. Afterward, the air passes through the intake pipe 101 and flows into the cylinder 123 when the intake valve 111 is opened. Gas combusted in the cylinder (combustion chamber) passes through the exhaust valve 112, an exhaust pipe 110, a catalytic converter 115 a muffler 117, afterward the gas is exhausted into the air.

The fuel injection timing of the fuel injection valve 122, the ignition timing of the spark plug 113 and each opening of the intake control valve 103, the electronic controlled throttle valve 104 and an EGR control valve (not shown in Figs) are set and controlled to an optimum value and optimum timing by a computer 201 based upon information such as an intake air flow measured by the air flow meter 105, an angle of an accelerator pedal, engine water temperature, engine speed and vehicle speed (no sensor that inputs them is shown).

When a condition of the engine is determined as a low-load condition in normal driving of the vehicle, the computer 201 controls the opening of the intake control valve 103 so that the strength of a tumble flow made in the cylinder becomes optimum. In this embodiment, it is premised that the intake control valve 103 is fully closed in order to get the optimum tumble flow. In this condition, at the latter half of a compression stroke, fuel is injected at 40 degrees before a top dead center for example.

Figure 5:
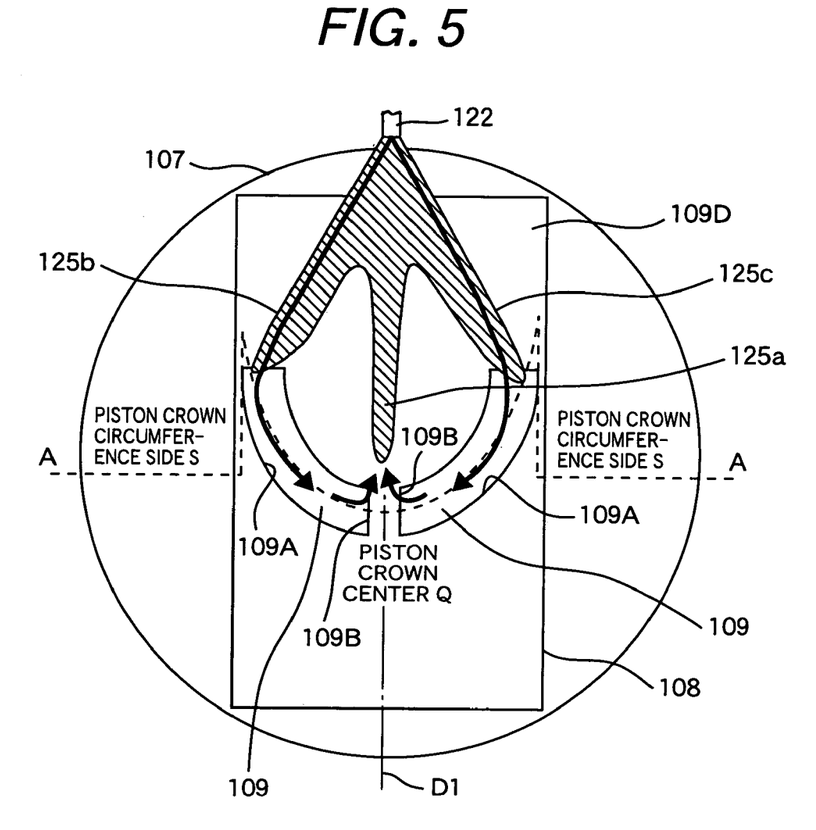
FIG. 5 is a top view of the piston showing a behavior of spray in the first embodiment.
Figure 6:
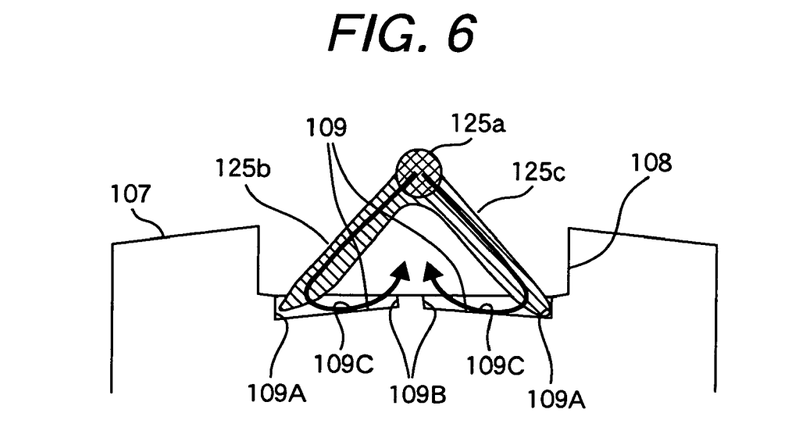
FIG. 6 shows the behavior of spray in the first embodiment on the piston developed along the curved grooves.

FIGS. 5 and 6 are schematic diagrams showing a behavior of the fuel spray on the top surface of the piston in the first embodiment.

Figure 9:
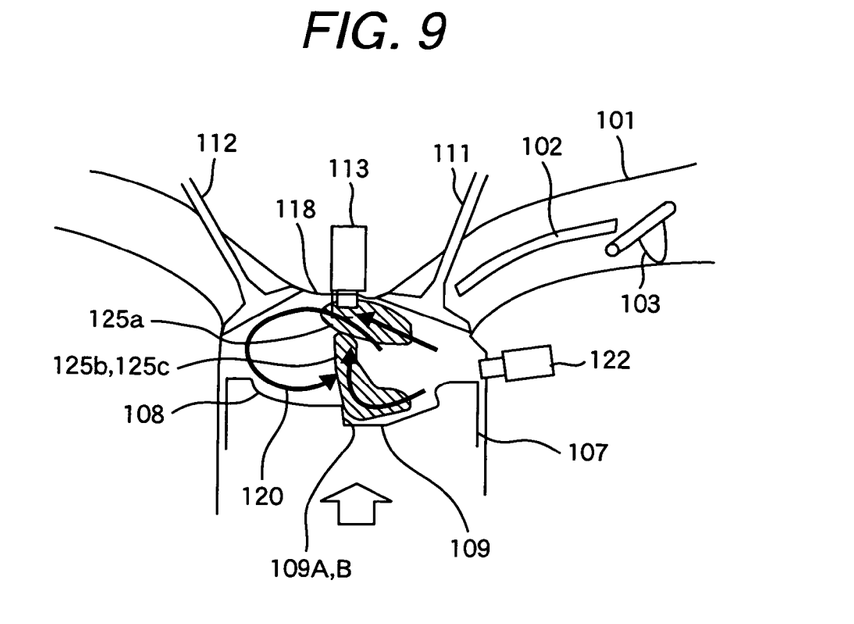
FIG. 9 shows a state in which air-fuel mixture is formed at approximately 20 degrees before the top dead center at the compression stroke in the low-load condition in the first embodiment.

One concentrated fuel spray band portion (hereinafter called "fuel spray band portion") 125a directed to the spark plug 113 (not shown in FIGS. 5 and 6) directly reaches the vicinity of the spark plug 113; the fuel spray is vaporized; and air-fuel mixture is formed around the spark plug 113. In the meantime, other two concentrated fuel spray band portions (hereinafter called "fuel spray band portions") 125b and 125c toward the piston 107 reach the vicinity of the starting points of the respective curved grooves 109; and they are guided therefrom (the vicinity of the longitudinal edges of the curved surface portion 108) to the position nearly below the spark plug 113. Afterward, the opposite spray band positions 125b and 125c come out of each endpoint 109B of the curved grooves 109, and they collide with each other. Thereby, an ascending fuel spray current is formed in the vicinity of the center of the piston 107. Thus, the fuel spray is lifted with a tumble flow 120 as shown in FIG. 9, and reaches the spark plug 113. Satisfactory air-fuel mixture accordingly can be stratified around the plug 113 and the high stability of combustion can be realized.

Figure 7:
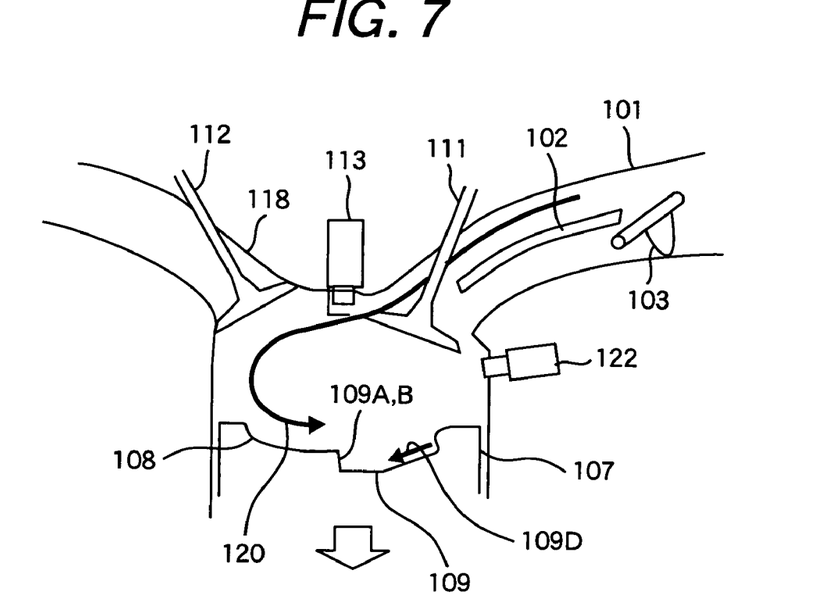
FIG. 7 shows a state at an intake stroke in a low-load condition in the first embodiment.
Figure 8:
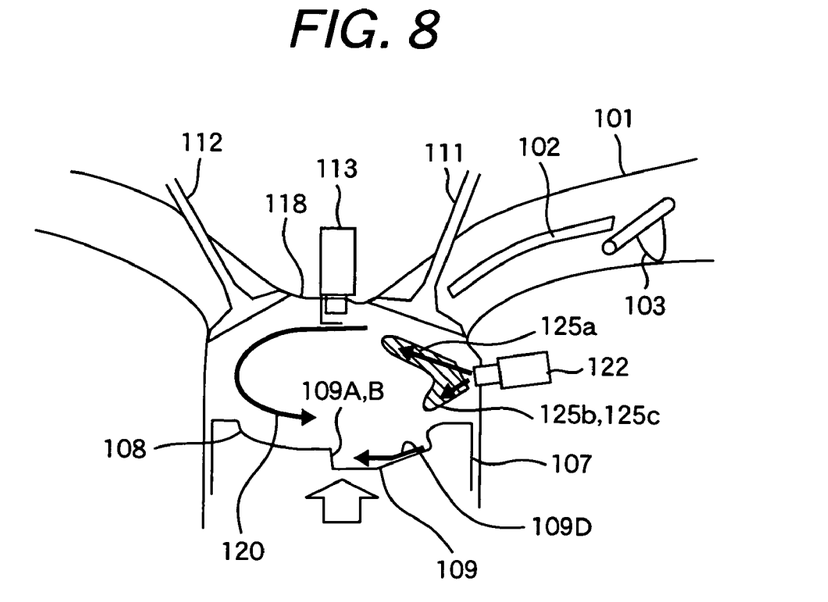
FIG. 8 shows a state in which air-fuel mixture is formed at approximately 40 degrees before a top dead center at a compression stroke in the low-load condition in the first embodiment.

Inside states of the cylinder from an intake stroke to a compression stroke in the low-load condition in the first embodiment are shown by FIGS. 7 to 9. FIG. 7 shows the inside state of the cylinder at the intake stroke thereof. In FIG. 7, the intake valve 111 is open, the piston 107 moves down, and air flows into the cylinder from the intake pipe 101. At this time, as the intake control valve 103 is closed, air is taken in from only the upper intake passage over the partition plate 102, flows into the cylinder 118, and forms the tumble flow 120 having an axis substantially perpendicular to a paper surface. The exhaust valve 112 is closed.

The tumble flow 120 is turned along the curved surface portion 108 on the top surface of the piston 107. The turn thereof is held during a long time period, compared with a case that the piston 107 has another shape. In FIG. 7 and drawings described later, the curved groove 109 on the piston 107 is shown as a longitudinal recessed portion for explanation, however, the curved groove actually has a shape mainly shown in FIGS. 3 and 4.

FIG. 8 shows the inside state of the cylinder at approximate 40 degrees before a top dead center for example at the compression stroke in the low-load condition in the first embodiment. After the intake stroke, the intake valve 111 is closed, and intake air is compressed by moving upward of the piston 107. At this time, the three fuel spray band portions 125a, 125b, 125c are injected from the injector 122; the fuel spray band portion 125a travels in the direction of the spark plug 113; and the fuel spray band portions 125b and 125c travels in the directions of the curved grooves 109 on the piston 107.

FIG. 9 shows the state of air-fuel mixture at approximate 20 degrees before the top dead center for example at the latter half of the compression stroke in the low-load condition in the first embodiment. The piston 107 further moves upward, compared with that shown in FIG. 8. The fuel spray band portion 125a out of the fuel spray band portions 125a, 125b and 125c shown in FIGS. 5 and 6, reaches the spark plug 113; and air-fuel mixture is formed in the vicinity of the spark plug by the vaporization of the fuel spray band portion 125a. The fuel spray band portions 125b and 125c travel toward the curved grooves 109, move along the grooves, and mutually collide with each other at the position nearly below the spark plug 113. Thereby, as already has been described, the ascending fuel spray current is formed in the vicinity of the center of the piston 107, further lifted with a tumble flow 120, and reaches the spark plug 113. Further, the fuel spray guided to the vicinity of the spark plug 113 by the tumble flow 120 becomes air-fuel mixture.

In this state, an ignition signal is sent to the spark plug 113 from the computer 201 shown in FIG. 1, when ignition is made by the spark plug 113, stable ignition and formation of flame are performed because rich air-fuel mixture is formed in the vicinity of the spark plug 113, and afterward, flame is gradually propagated to the piston circumference side where the equivalence ratio is small. Thus, stable and satisfactory stratified combustion is enabled.

Incidentally, when the engine is in cold state, air-fuel mixture is formed around the spark plug 113 by the similar method to that shown in FIGS. 7 to 9, and after-burning is positively caused by igniting at as late timing as possible while the air-fuel mixture is not diffused. Consequently, exhaust temperature is raised, and therefore, the early activation of a three-way catalyst 115 is enabled.

Figure 10:
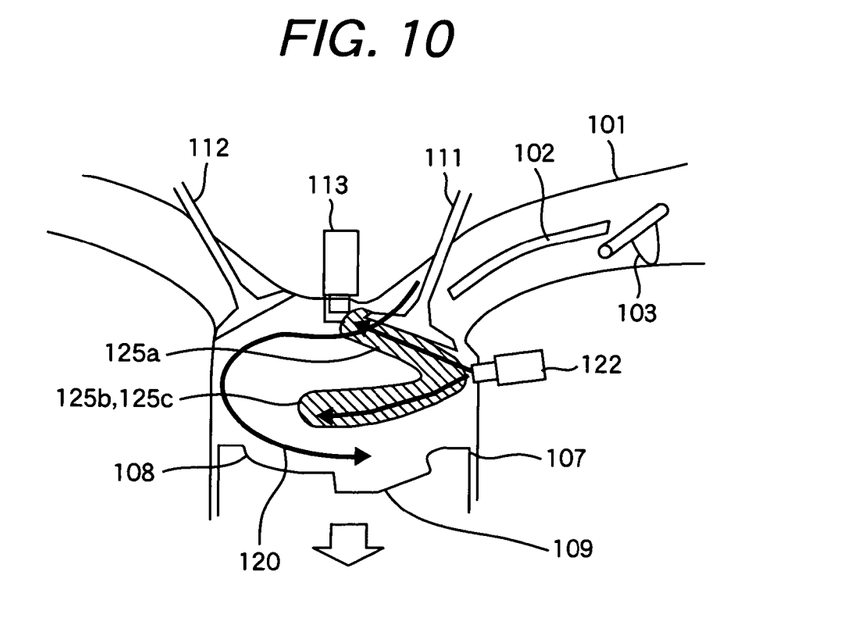
FIG. 10 shows a state in which air-fuel mixture is formed in a middle-load condition in the first embodiment.

FIG. 10 shows a state of air-fuel mixture in a middle-load condition in the first embodiment. FIG. 10 shows the intake stroke of the engine. As shown in FIG. 10, when the intake valve 111 is opened in a state in which the intake control valve 103 is closed, a tumble flow 120 is formed inside the cylinder 118 by moving down of the piston 107. The tumble flow is held by the curved surface portion 108 provided to the piston 107. As the depth of the curved groove 109 similarly provided to the piston 107 is approximately 2 mm and the curved groove is shallow, compared with the curved surface portion 108, the curved groove does not prevent the tumble flow from being held. At this time, as the fuel spray band portion 125a from the injector 122 is directly directed to the spark plug 113, slightly richer air-fuel mixture is formed in the vicinity of the spark plug 113, compared with another location and can be securely ignited. In the meantime, the fuel spray band portions 125b and 125c directed to the piston 107 do not enter (reach) the curved grooves 109 because the piston 107 is lowered than the case of injection at 40 degrees before the compression top dead center, the fuel spray band portions 125b and 125c directly advance and travel to the side of the exhaust valve. In such a state, air-fuel ratio is near to theoretical mixture ratio, the mixture of air and fuel is accelerated by the tumble flow 120, and combustion efficiency can be enhanced. At this time, the mixture of air on the side of the exhaust valve and the fuel spray band portions 125b and 125c is accelerated, and the utilization factor of air can be enhanced.

In the middle-load condition, fuel can be also injected at the compression stroke, in this case, when fuel is injected from the injector 122 in a state in which the position of the piston 107 is low as shown in FIG. 10, only the fuel spray band portion 125a is concentrated in the vicinity of the spark plug 113, the fuel spray band portions 125b, 125c are formed as air-fuel mixture on the piston side or on the exhaust side. Accordingly, a state of so-called weak stratification can be easily produced, and combustion efficiency can be enhanced.

Figure 11:
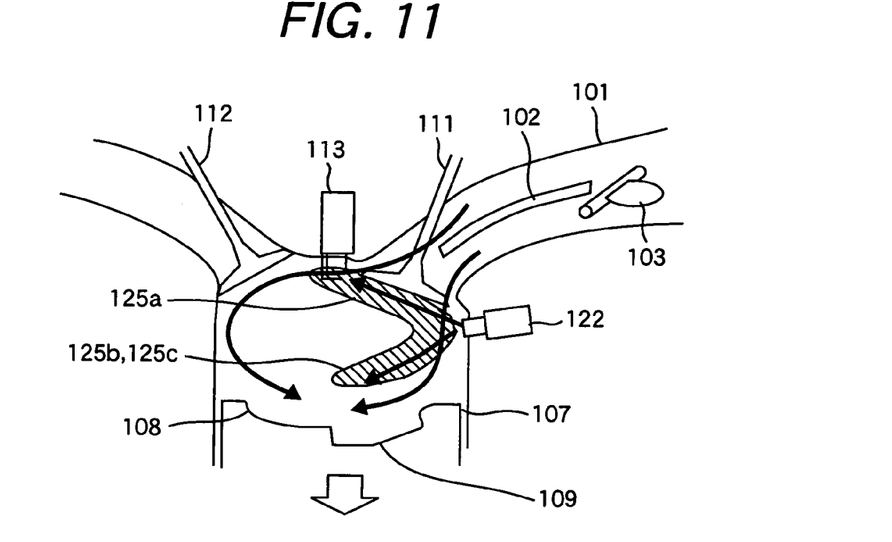
FIG. 11 shows a state in which air-fuel mixture is formed in a high-load condition in the first embodiment.

FIG. 11 shows a state where air-fuel mixture is formed in a high-load condition in the first embodiment. FIG. 11 shows the intake stroke. In this state, the intake control valve 103 is opened, and air is taken in from upper and lower passages produced by the partition plate 102 in the intake pipe 101. Thereby, as intake air passage resistance is small, more air can be taken in. At this time, as shown in FIG. 10, the fuel spray band portion 125a is directed to the spark plug 113, the utilization factor of air in the whole cylinder 118 is enhanced because the other fuel spray band portions 125b, 125c reaches the exhaust side without entering the curved grooves 109, and output of the engine can be enhanced.

Figure 12:
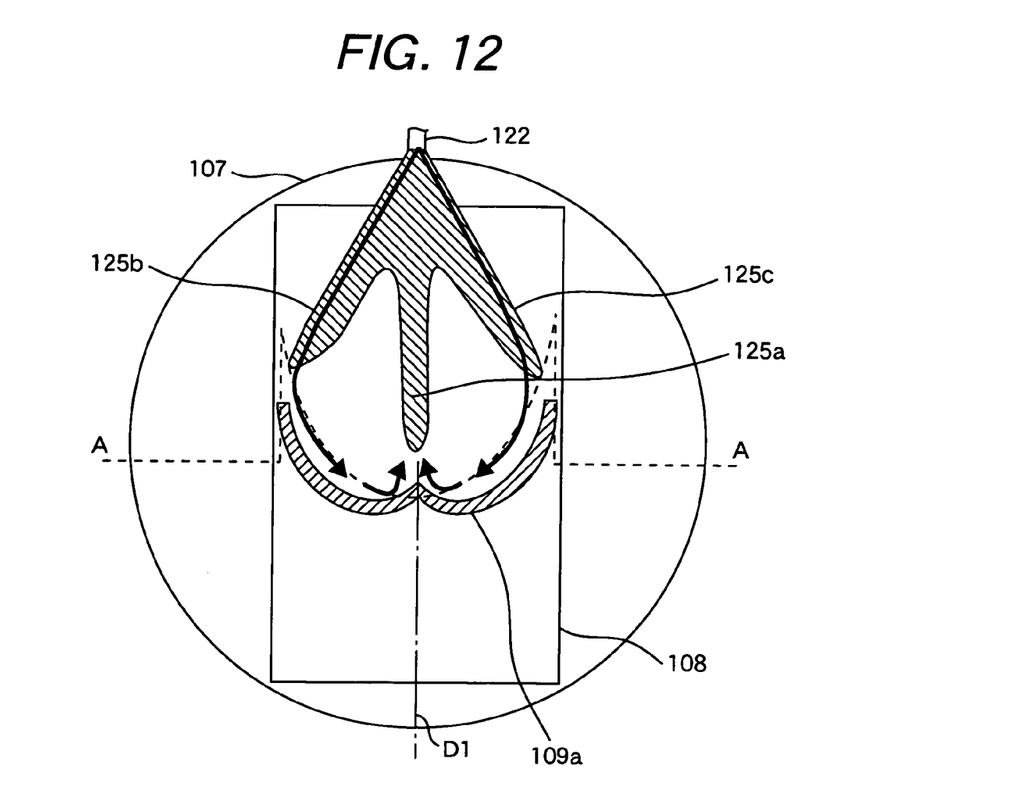
FIG. 12 shows the configuration of a second embodiment of the invention viewed from the upside of an engine.
Figure 13:
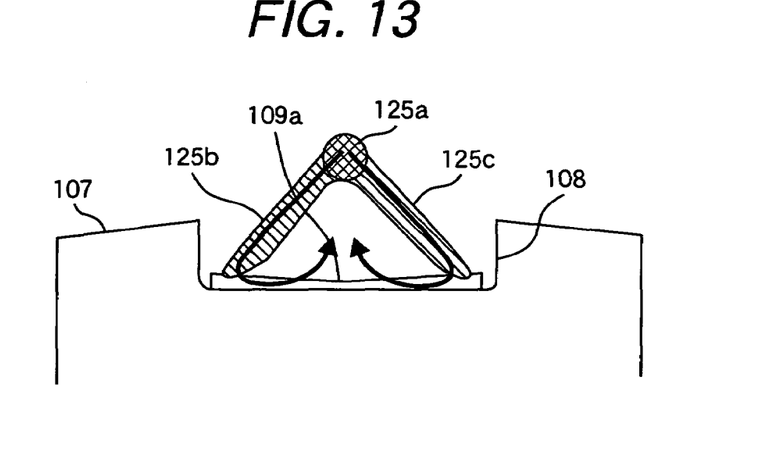
FIG. 13 shows a piston in a second embodiment developed along curved grooves.

FIGS. 12 and 13 show a second embodiment of the invention. As with the first embodiment, a curved surface portion 108 for holding a tumble flow is provided on a piston 107. The curved surface portion 108 is provided with a guide projection 109a instead of the curved grooves 109A and 109B. The guide projection 109a is provided on the curved surface portion 108 so as to guides fuel spray band portions 125b and 125c, which are directed from an injector 122 to the piston 107, immediately below an spark plug 113. The projection 109a is low in height and the height is set to 2 mm or less for example. Further, in order to attenuate a fuel spray speed component directed to the exhaust valve side which is the lower side in FIG. 12, the projection is set to a nearly W-shaped which takes the shape of joining a pair of arcs being symmetrical with respect to a piston diameter line (D1) as shown in FIG. 12. According to such a arrangement, as with the first embodiment, the fuel spray band portions 125b, 125c are guided by the projection 109a, afterward, they mutually collide immediately below the spark plug 113. Thereby, an ascending fuel spray current is formed in the vicinity of the center of the piston 107, and the fuel spray can be carried to the spark plug 113 by a tumble flow 120, and satisfactory stratified combustion can be realized.

Figure 14:
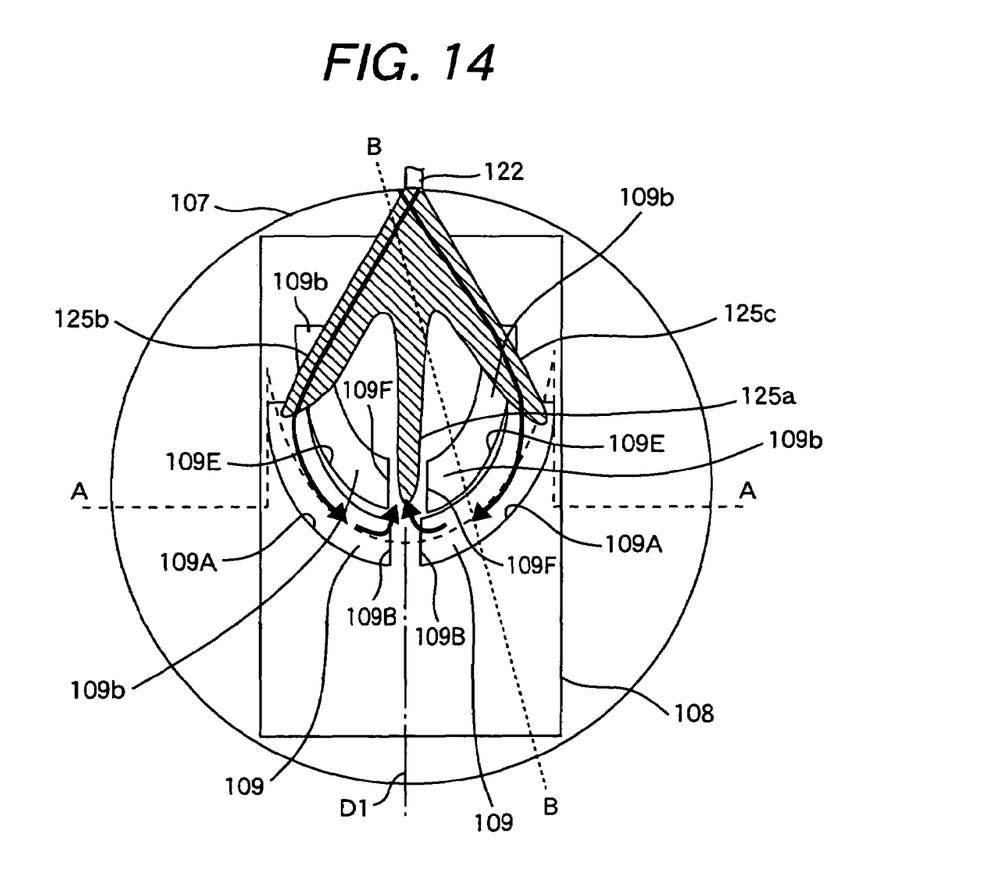
FIG. 14 shows the configuration of a third embodiment of the invention viewed from the upside of an engine.
Figure 15:
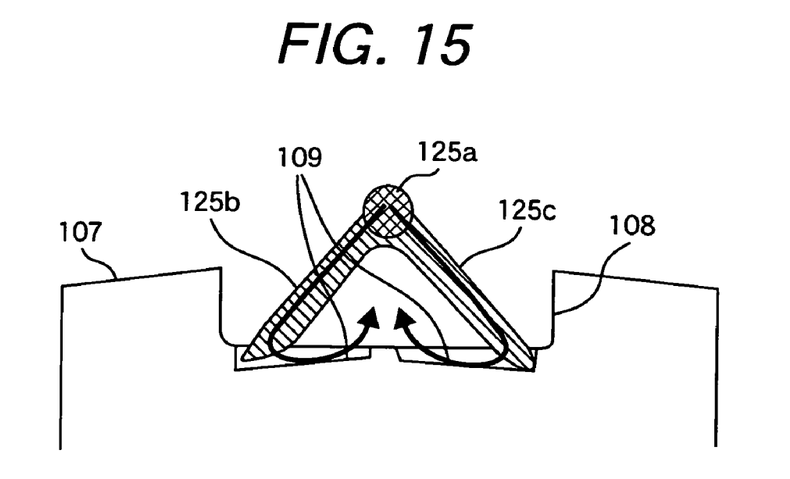
FIG. 15 shows a piston in the third embodiment developed along curved grooves.
Figure 16:
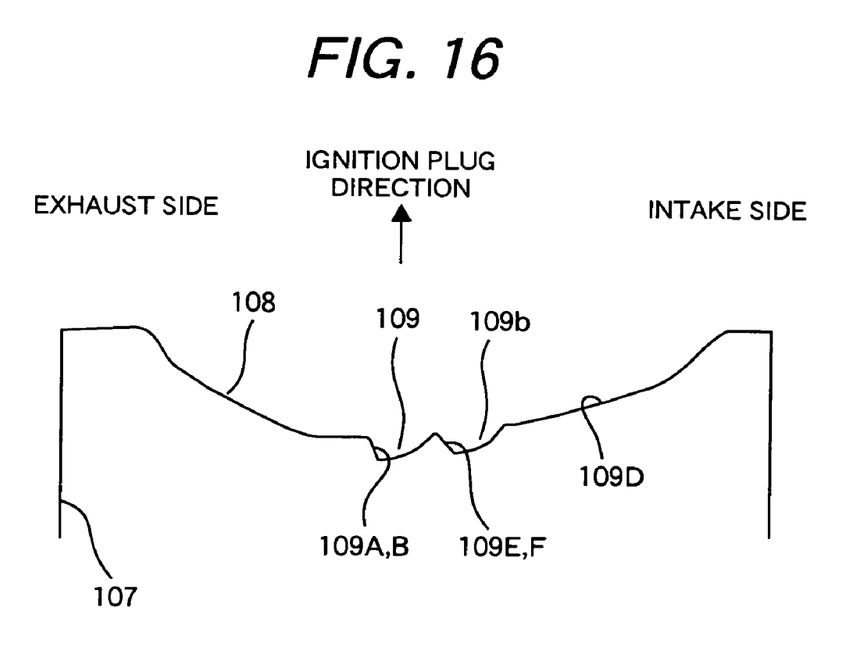
FIG. 16 shows the piston in the third embodiment viewed from a virtual section substantially perpendicular to the grooves.

FIGS. 14 to 16 show a third embodiment of the invention. As with the first embodiment, a curved surface portion 108 for holding a tumble flow is provided on a piston 107 and another curved groove 109b is provided inside each curved groove 109 provided on the curved surface portion 108. Each starting point of these curved grooves 109 and 109b is located in the edge of the curved surface portion 108. These curved grooves are shaped so that the fuel spray directed to the circumference side of the piston 107 can be gradually guided to the center of the piston 107, and when these are viewed along a B—B virtual section of FIG. 14 as shown in FIG. 16, the curved grooves 109 and 109b are in contact.

According to the above construction, even if ignition timing is lagged, compared with the case in the first embodiment, fuel spray band portions 125b, 125c can be guided to the center of the piston 107 by the curved grooves 109b.

The fuel spray band portions 125b, 125c mutually collide immediately under the spark plug 113, they are lifted in a direction of the spark plug 113, afterward they can be further carried to the spark plug 113 by a tumble flow 120, and satisfactory stratified combustion can be realized.

Figure 17:
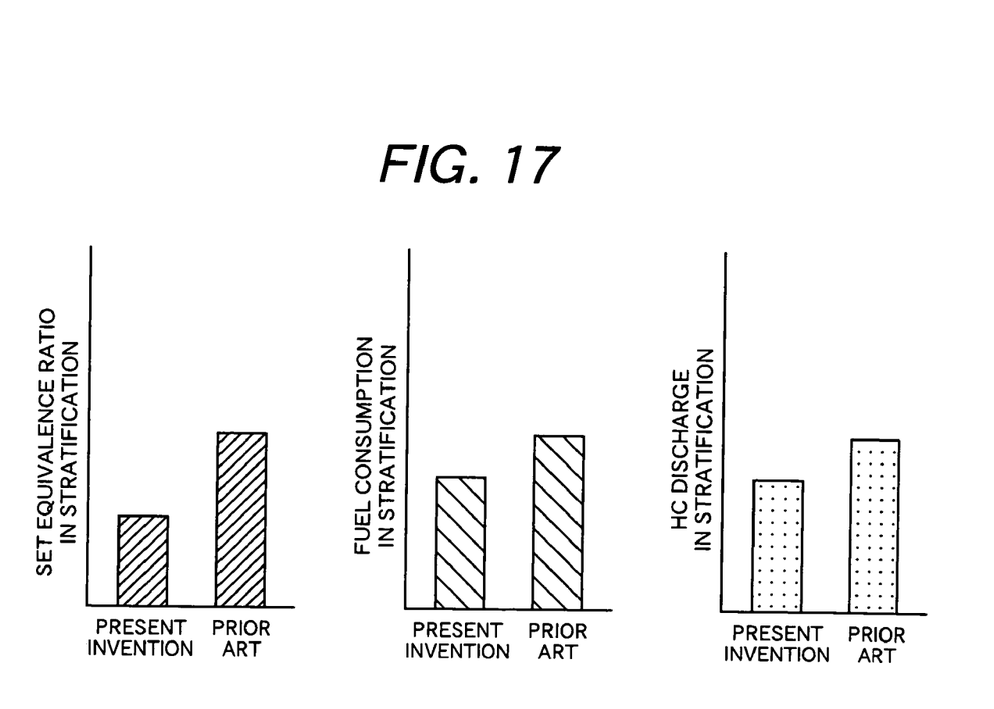
FIG. 17 shows the comparison of equivalent ratio, fuel consumption and the discharge of HC in the present invention and the prior art.

FIG. 17 shows the comparison of the present invention and the prior art. As secure and satisfactory stratified combustion is enabled according to the invention, compared with the prior art, fuel consumption can be inhibited by reducing air-fuel ratio and by increasing an amount of EGR. As the adhesion of fuel to the wall of the piston 107 and the cylinder 118 is inhibited, the discharge of HC can be also reduced. Further, the discharge of HC and NO$_x$ can be further inhibited by executing stratified slight lean combustion at the time of the cold engine such as immediately after the engine is started.

A scope of the invention is not necessarily limited to these embodiments. For example, even if the number of the concentrated fuel spray band portions is changed, so long as there is a configuration where concentrated fuel spray bands are directed to the vicinity of the spark plug 113 and the guide curved grooves 109 or the guide projection 109a on the piston 107, and where the spray 125 is guided to the vicinity of the spark plug 113, it is evidently included in the scope of the invention. It is self-evident that optimum positions of the curved grooves 109 and the projection 109a on the piston vary depending on a characteristic of fuel spray such as a spray angle and penetration and a characteristic on the side of the engine such as the dimension of a bore of the piston. For example, when a spray angle is small and the piston bore is large, positions of the curved grooves 109 are set to the vicinity of the center of the piston. Such a case may be different from the description of the embodiments in which the fuel spray band portions is guided from the edge side of the curved surface portion to the center. However, the case is also naturally included in the scope of the invention.

According to these embodiments, the following problems can be solved.

Heretofore, a spark ignition gasoline engine that directly injects fuel into a cylinder is widely known. In this mechanism, technique for executing so-called stratified combustion where air-fuel mixture in a cylinder is concentrated in only the vicinity of a spark plug, is capable of reducing pumping loss and enhancing fuel economy. Technique for positively forming a tumble flow in a cylinder and utilizing this is also used to realize a larger operating range and enhance output in a high-load condition of the engine.

Japanese Unexamined Patent Publication No. 2000-130171 related to these techniques, discloses the following matter. A bowl is provided on a piston crown of an engine. Furthermore, a recessed portion recessed more deeply than the bowl is formed in a range from the intake valve side on the piston crown surface toward the nearly center of the piston. The depth of the recessed portion shall be equivalent to approximately a quarter of the height of the cylinder between 30 degrees and 10 degrees before the top dead center in a crank angle.

A tumble flow is generated in the cylinder by a flow of air that flows into the cylinder from an intake pipe. Fuel is injected at the time of 40 to 10 degrees before a top dead center at an intake stroke in a crank angle in a low-load condition, while holding the tumble flow by the curved surface portion during a long time period. The fuel is guided to the vicinity of the spark plug by the recessed portion further provided to the bowl like curved surface portion, and stratified combustion is performed. Further, in a middle-load condition, a fuel is injected at the time of 70 to 30 degrees before the top dead center. The fuel is carried to the vicinity of the spark plug by making spray ascend by using the held tumble flow without depending upon the recessed portion, and stratified combustion is performed. In a high-load condition, a fuel is injected at the intake stroke, a fuel spray and air are satisfactorily mixed by a tumble flow held by the curved surface portion, and homogeneous combustion is performed. Satisfactory combustion accordingly can be realized in a wide engine operating range.

However, in the above-mentioned configuration, the following problems are caused.

That is, as a normal conical spray with nearly uniform distribution in a circumferential direction is used in the above-mentioned configuration, a penetration of the spray is relatively small. Therefore, at the vicinity of the top dead center in the compression stroke such as approximately at 30 degrees before the top dead center, a spray angle is narrowed, and the whole quantity of the spray is injected toward the piston. Therefore, the recessed portion on the piston crown is required to be made deep so that the depth is equivalent to approximately a quarter of the height of the cylinder between 30 degrees and 10 degrees before the top dead center in a crank angle.

In the above configuration, as the bowl is relatively deep, and the additional recessed portion deeper than the bowl is provided, the surface area of the piston increases. As a result, particularly in a high-load condition of the engine, output and fuel economy of the engine are deteriorated due to the increase of cooling loss is caused.

Furthermore, the whole spray is required to be caught by the bowl, the width of the bowl surface is required to be extended. Accordingly, it is difficult to enhance the concentration of air-fuel mixture around the spark plug. As the surface shape of the bowl is greatly different from that of a curved surface for forming tumble flow, the tumble flow is easily diffused and it is difficult to hold the tumble flow.

Further, when executing so-called stratified slight lean combustion where fuel is injected at the compression stroke in a state in which the engine and the piston are cold and in a state of immediately after the engine is started, spray adheres to the wide bowllike curved surface in large quantities because the whole spray is directed toward the bowl surface. Such adhesion of fuel spray becomes unburned hydrocarbon (UHC) and makes deterioration of exhaust. The combustion is additionally easily turned unstable.

According to these embodiments of the present invention, the above-mentioned problems can be solved as follows.

As the cooling loss of the engine is small, the tumble flow in cylinder is held during a long time period, and the stratified combustion system excellent in output and efficiency is realized.

Furthermore, the systems of the present embodiments can enhance the concentration of air-fuel mixture around the spark plug while holding the tumble flow.

Further, the system can execute stable stratified slight lean combustion in which fuel hardly adheres to the piston even in the cold engine such as immediately after the engine is started.

Embodied examples concerning the present invention are as follows. Numeral used for explanation of the following technical terms are cited from drawings of the above-mentioned embodiments.

EMBODIED EXAMPLE 1

A direct-injection engine comprises a fuel injection valve (injector) 122 for directly injecting a fuel into a cylinder 123 of an internal combustion engine, and a piston 107 having a piston crown with a curved wall guide 109A for guiding a fuel spray (125b, 125c) injected from the injector 122.

The curved wall guide 109A on the piston crown comprises an arc-shaped walls (arc-shaped grooves 109A or arc-shaped projection 109a) is extended from the circumference side (S) of the piston crown on the injector installation side with respect to the center (Q) of piston crown to the center (Q) side thereof. The injector 122 is configured to inject the fuel spray (namely fuel spray band 125a, 125b and 125c) distributed in a direction of a spark plug 113 provided at a cylinder head and in a direction of the curved wall guide 109A on the piston crown.

EMBODIED EXAMPLE 2

The curved wall guide is comprises a pair of arc-shaped walls 109A disposed on the both sides of a line D1 liking between a point directly below the injector 122 and the center Q of the piston crown. A partition wall 109B is located between the arc-shaped walls 109A. Both side faces of the partition wall 109B form ends of the arc-shaped walls 109A.

EMBODIED EXAMPLE 3

The piston crown surface has a local slope portion 109C along the curved wall guide 109A, and the local slope portion 109C is formed with up-grade from the circumference side S of the piston crown toward the center Q thereof. For example, the curved wall guide 109A is formed by a wall of an arc-shaped groove 109 provided on the piston crown. A bottom (the local slope) of the arc-shaped groove 109A has an up-grade from the circumference side S of the piston crown toward the center Q thereof.

EMBODIED EXAMPLE 4

The piston crown has a down-grade curved surface 109D from the side of the injector 122 to the center Q side of the piston crown, and the local slope portion 109C is formed within an area of the down-grade curved surface 109D on the piston crown.

EMBODIED EXAMPLE 5

The injector 122 is provided at a cylinder block on the side of an intake valve 111 of the cylinder 118. A flow of air taken in from the intake valve 118 into the cylinder 123 forms a forward tumble flow 120 in the cylinder.

EMBODIED EXAMPLE 6

The wall-height of the arc-shaped groove 109 as the curved wall guide 109A is set to approximately 2 mm or less at the maximum high (deep). The width between the starting point S and the endpoint 109B of the arc-shaped groove 109 is set to 10 mm or less.

EMBODIED EXAMPLE 7

The forward tumble flow 120 forms a flow in a direction of the spark plug 113 along a recessed curved surface portion 108 formed on the piston crown.

EMBODIED EXAMPLE 8

The direct-injection engine further comprises a mechanism for increasing idle speed for warming-up of the engine and a catalytic converter after starting of said engine. For example, as such a mechanism, (i) a throttle valve of an electronic controlled throttle 104 is opened to execute idle speed increasing control by a computer 201. (ii) The ignition timing of the spark plug 113 is retarded up to approximately 25 degrees after a top dead center.

EMBODIED EXAMPLE 9

The direct-injection engine comprises means for stratifying air-fuel mixture or forming homogeneous air-fuel mixture by controlling opening/closing of the intake control valve 103 by the computer 201 according to a load of the engine.

EMBODIED EXAMPLE 10

The curved wall guide comprises two or more arc-shaped walls (109A, 109E) being formed in parallel.

EMBODIED EXAMPLE 11

In the direct-injection engine, the partition wall 109B is located not immediately under the spark plug but on the side of an exhaust valve.

EMBODIED EXAMPLE 12

A engine control method applied for the direct-injection engine, comprises step of controlling at least one of injected fuel quantity, airflow rate and ignition timing so that the exhaust temperature of the engine becomes at least 700° C. or more when the temperature of the engine or a catalytic converter (a three way catalytic converter 115) immediately after engine starting is lower than a specific value.

EMBODIED EXAMPLE 13

A piston 107 used for the direct-injection engine comprises a pair of right and left arc-shaped walls 109A served as the curved wall guide on the piston crown, and a partition wall 109B located between the ark-shaped walls 109A. The partition wall 109B forms the ends of the ark-shaped walls 109A.

EMBODIED EXAMPLE 14

A fuel injection valve used for the direct-injection engine is configured as follows. The injection valve (injector 122) forms a first concentrated fuel spray band 125a with a specific deflection angle in the center position. Furthermore, the injector 122 forms a pair of second concentrated fuel spray bands 125b and 125c with a specific deflection angle opposite to the first fuel spray band's deflection angle on the both sides of the first fuel spray.

EMBODIED EXAMPLE 15

A direct-injection engine comprises two intake valves 111 and two exhaust valves 112 provided at a pent roof type a cylinder head. A spark plug 113 is provided at the substantial center of the cylinder head. A fuel injection valve (injector 122) directly injects a fuel into a cylinder. The injector 122 is installed on the intake valve 111 side with respect to the center of the cylinder head. The engine is further configured to performs stratified combustion by injecting a fuel at a compression stroke in a state where a tumble flow is formed in the cylinder. The engine further comprises a piston 107 has a piston crown with a recessed curved surface 108 and a pair of arc-shaped grooves 109. The recessed curved surface 108 is deeply recessed at the vicinity immediately below the spark plug 113 on the piston crown. The pair of arc-shaped grooves 109 are formed on the recessed curved surface 108, and located on the intake valve 111 side with respect to the center Q of the piston crown. Further the grooves are disposed so as to symmetric with respect to a piston diameter line D1 linking between a point directly below the injector 122 and the center Q of the piston crown, and extended from the circumference side of the piston crown toward the center thereof. The injector 122 is configured to form a first concentrated fuel spray band 125a directed to the spark plug 113 and a second concentrated fuel spray bands (125b, 125c) directed to the arc-shaped grooves 109A.

EMBODIED EXAMPLE 16

The recessed curved surface 108 is shaped with concave surface extending from the intake valve 111 side to the exhaust valve 112 side.

EMBODIED EXAMPLE 17

A direct injection type gasoline engine as an internal combustion engine is provided with a mechanism for directly injecting a fuel in to a cylinder. The engine is further provided with; a mechanism for increasing idle speed for the warm-up of the engine and a catalytic converter after starting; means for stratifying air-fuel mixture or forming homogeneous air-fuel mixture by controlling opening/closing of an intake control valve according to a load over; a curved surface portion for holding a tumble flow on a piston. A fuel spray injected from a fuel injection valve (injector) has three or more concentrated fuel spray bands. At least one of sprays from the injector is directed in a direction of a spark plug. A wall portion like a step (its also called as step-wall portion) is provided on the curved surface portion for holding the tumble flow to guide the other two or more concentrated fuel spray bands directed to the piston and the step-wall portion. The step-wall portion is made lower in a direction of a flow of the tumble.

EMBODIED EXAMPLE 18

A plurality of step-wall portions 91A for carrying a fuel spray immediately below the spark plug are provided on the piston crown.

EMBODIED EXAMPLE 19

A direct injection type gasoline engine is provided with a fuel injection valve (injector) on the side of an intake valve. The engine is configured so that a boundary surface of a step (109a) on a piston crown is formed along an arc which is directed from the side of an spark plug toward the side of an exhaust valve, after that, directed from the side of the exhaust valve toward the side of the spark plug.

EMBODIED EXAMPLE 20

The boundary surfaces of steps as the above mentioned curved-wall guide portion provided on the piston are substantially concentrically arranged so that they have substantial equal distance from the fuel injection valve.

In these embodiments configured as described above, the following action and advantages are realized.

First, The injected fuel spray is not conical spray like the prior art having substantially uniform distribution in a circumferential direction but a few of distributed fuel spray bands. Accordingly, a degree of the concentration of the spray can be higher than the prior art in comparison in the same fuel flow rate, and the penetration can be stronger. Therefore, even when the fuel is injected from the injector under high back pressure, the fuel also can reach a further position by its own energy. As at least one of the concentrated fuel spray bands is directly directed to the spark plug, the spray is concentrated in the vicinity of the spark plug, rich air-fuel mixture is easily formed around the spark plug, and satisfactory stratified combustion can be formed.

Further, when the injection is executed at a latter half of the compression stroke, the stratification of air-fuel mixture around the spark plug can be more accelerated by concentrating the fuel spray bands being directed to the circumference side of the piston to immediately below the spark plug by the curved grooves (arc-shaped grooves) on the piston crown. As the depth of each curved groove is set to 2 mm or less and the curved groove is sufficiently shallower than the curved surface portion for holding a tumble flow, the curved groove hardly affect the strength and the holding of the tumble flow. The satisfactory air/fuel mixture and combustion accordingly are realized by using the tumble flow even when the engine is in a middle-load condition.

In the meantime, when the fuel injection is done at the compression stroke at time when the engine is started in cold condition, as the injected fuel becomes a plurality of spray bands by the above-mentioned configuration. That is, at least one of the bands is directly directed to the spark plug and the other bands are also directed to the spark plug through the curved grooves. Therefore, the fuel is not diffused toward the surface of the piston and the cylinder wall, and no fuel exists on a quench area in the vicinity of the cylinder wall or even if fuel exists, it is kept an extremely small quantity. Therefore, the quantity of HC exhausted in a state in which it is unburned is kept an extremely small quantity.

At this time, as the air-fuel ratio is approximately theoretical air-fuel ratio (stoichiometric mixture ratio) or slight lean, the ratio of combustion gas to fuel is small, exhaust temperature is kept high, and the after burning of HC in the exhaust pipe easily occurs. When ignition is made at 25 degrees after the top dead center in a crank angle, most of mass can be combusted mainly at 30 degrees after the top dead center for example or later, after burning is increased, inhibiting effective engine torque up to suitable quantity, and exhaust temperature can be raised.

These embodiments synthetically produce advantages that the tumble flow is held during a long time period by the piston having the curved surface portion, and the engine combustion is accelerated. Therefore the combustion system in which the cooling loss is small can be realized, and excellent output and combustion efficiency can be realized.

These embodiments also produce advantages that a degree of the concentration of air-fuel mixture around the spark plug can be enhanced by injection at the compression stroke, being provided with the above-mentioned characteristics, and fuel economy can be further enhanced, inhibiting pumping loss.

Further, these embodiments produce advantages that the adhesion of fuel to the piston and the cylinder wall is reduced in the cold engine condition. Therefore, even when the stratified slight lean combustion is done, stable combustion is also enabled up to more retarded ignition, and exhaust gas can be reduced.

As described the above embodiments, the concentration of air-fuel mixture around the spark plug can be enhanced and stable combustion can be realized.

What is claimed is:

1. A direct-injection engine comprising: two intake valves and two exhaust valves provided at a pent roof type a cylinder head; a spark plug provided at the substantial center of said cylinder head; and a fuel injection valve for directly injecting a fuel into a cylinder, and which is installed on the intake valve side with respect to the center of said cylinder head, said engine is further configured to performs stratified combustion by injecting a fuel at a compression stroke in a state where a tumble flow is formed in the cylinder, wherein said engine further comprising a piston having a piston crown with a recessed curved surface and a pair of arc-shaped grooves, wherein said recessed curved surface is deeply recessed at the vicinity immediately below said spark plug on said piston crown, and said pair of arc-shaped grooves are formed on said recessed curved surface, located on the intake valve side with respect to the center of said piston crown, disposed so as to symmetric with respect to a piston diameter line linking between a point directly below said fuel injection valve and the center of said piston crown, and extended from the circumference side of said piston crown toward the center thereof, wherein said fuel injection valve is configured to form a first concentrated fuel spray band directed to said spark plug and a second concentrated fuel spray bands directed to said arc-shaped grooves.

2. A direct-injection engine according to claim 1, wherein said recessed curved surface is shaped with concave surface extending from the intake valve side to the exhaust valve side.

3. A direct-injection engine according to claim 1,
wherein each bottom of said arc-shaped grooves has an up-grade from the circumference side of said piston crown toward the center thereof.

4. A direct-injection engine according to claim 1,
wherein said recessed curved surface on said piston crown has a down-grade curved surface portion from the side of said fuel injection valve to the center side of said piston crown, and said arc-shaped grooves are formed within an area of said down-grade curved surface portion on said piston crown.

5. A direct-injection engine comprising a fuel injection valve for directly injecting a fuel into a cylinder of an internal combustion engine, and a piston having a piston crown with a curved wall guide for guiding a fuel spray injected from said fuel injection valve, wherein said curved wall guide on said piston crown comprises an arc-shaped wall being extended from the circumference side of said piston crown on the fuel injection valve installation side with respect to the center of said piston crown to the center side thereof, and said fuel injection valve is configured to inject a fuel spray distributed in a direction of a spark plug provided at a cylinder head and in a direction of said curved wall guide on said piston crown.

6. A direct-injection engine according to claim 5, wherein said curved wall guide is comprises a pair of arc-shaped walls disposed on the both sides of a line liking between a point directly below the injector and the center of the piston crown; a partition wall is located between said arc-shaped walls; and both side faces of said partition wall form ends of said arc-shaped walls.

7. A direct-injection engine according to claim 6,
wherein said partition wall is located not immediately below said spark plug but on the exhaust valve side of the engine.

8. A direct-injection engine according to claim 5, wherein said piston crown surface has a local slope portion along said curved wall guide, and said local slope portion is formed with up-grade from the circumference side of the piston crown toward the center thereof.

9. A direct-injection engine according to claim 8,
wherein said piston crown has a down-grade curved surface from the side of said fuel injection valve to the center side of said piston crown, and said local slope portion is formed within an area of said down-grade curved surface on said piston crown.

10. A direct-injection engine according to claim 8,
wherein the wall-height of said arc-shaped groove as said curved wall guide is set to 2 mm or less; and
the width between the starting point and the endpoint of said arc-shaped groove is set to 10 mm or less.

11. A direct-injection engine according to claim 5,
wherein said fuel injection valve is provided at a cylinder block on the side of an intake valve of said cylinder, and
a flow of air taken in from said intake valve into said cylinder forms a forward tumble flow in said cylinder.

12. A direct-injection engine according to claim 11,
wherein said forward tumble flow forms a flow in a direction of said spark plug along a curved surface portion formed on said piston crown.

13. A direct-injection engine according to claim 5, further comprising a mechanism for increasing idle speed for warming-up of said engine and a catalytic converter after starting of said engine.

14. A direct-injection engine according to claim 5, comprising
means for stratifying air-fuel mixture or forming homogeneous air-fuel mixture by opening/closing control of a intake valve 103 according to load of said engine.

15. A direct-injection engine according to claim 5, wherein said curved wall guide comprises two or more arc-shaped walls being formed in parallel.

16. A engine control method applied for said direct-injection engine of claim 5, comprising step of controlling at least one of injected fuel quantity, airflow rate and ignition timing so that the exhaust temperature of the engine becomes at least 700° C. or more when the temperature of the engine or a catalytic converter immediately after engine starting is lower than a specific value.

17. A piston used for said direct-injection engine of claim 5, comprising:
a pair of right and left arc-shaped walls served as said curved wall guide on the piston crown, and
a partition wall located between said ark-shaped walls,
wherein said partition wall forms the ends of said ark-shaped walls.

18. A fuel injection valve used for said direct-injection engine of claim 5,
wherein said injection valve is configured to form a first concentrated fuel spray band with a specific deflection angle in the center position, and to form a pair of second concentrated fuel spray bands with a specific deflection angle opposite to said first fuel spray band's deflection angle on the both sides of said first fuel spray.

* * * * *